(12) United States Patent
Khan

(10) Patent No.: US 8,531,509 B2
(45) Date of Patent: Sep. 10, 2013

(54) METHOD AND SYSTEM FOR THREE-DIMENSIONAL DISPLAYS

(75) Inventor: Sajjad Ali Khan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1384 days.

(21) Appl. No.: 11/965,119

(22) Filed: Dec. 27, 2007

(65) Prior Publication Data

US 2009/0167845 A1 Jul. 2, 2009

(51) Int. Cl.
*H04N 13/04* (2006.01)

(52) U.S. Cl.
USPC .............................................. 348/56; 348/51

(58) Field of Classification Search
None
See application file for complete search history.

(56) References Cited

U.S. PATENT DOCUMENTS

| | | | | |
|---|---|---|---|---|
| 4,424,529 A | * | 1/1984 | Roese et al. | 348/51 |
| 4,792,850 A | | 12/1988 | Liptoh | |
| 4,967,268 A | * | 10/1990 | Lipton et al. | 348/56 |
| 5,714,997 A | * | 2/1998 | Anderson | 348/48 |
| 5,821,989 A | * | 10/1998 | Lazzaro et al. | 348/53 |
| 6,252,624 B1 | * | 6/2001 | Yuasa et al. | 348/56 |
| 6,791,599 B1 | * | 9/2004 | Okada et al. | 348/56 |
| 2007/0003134 A1 | * | 1/2007 | Song et al. | 348/51 |

FOREIGN PATENT DOCUMENTS

| | | | |
|---|---|---|---|
| JP | 2001326947 A | * | 11/2001 |
| JP | 2001326948 A | * | 11/2001 |

OTHER PUBLICATIONS

Travis, A.R.L. "The Display of Three-Dimensional Video Images." Proceedings of the IEEE. vol. 85, No. 11. Nov. 1997. 1817-32.*
Sajjad A. Khan, et al.; "A Polarized Light Emitting Diode and Use Thereof;" U.S. Appl. No. 11/959,678; 31 pages.
Yu-Jun Wu, et al.; "20.2: Stereoscopic 3D Display using Patterned Retarder," SID 08 Digest, ISSN/008-0966X/08/3901-0260, p. 260-263, 2008.
Wei-Hung Kuo, et al.; "20.3: 2D/3D Dual-Image Switchable Display," SID 08 Digest, ISSN/008-0966X/08/3901-0264; p. 264-266, 2008.
Hyung-ki Hong, et al.; "25.3: Autostereoscopic 2D/3D Switching Display Using electric-Field-Driven LC Lens (ELC Lens);" SID 08 Digest, ISSN/008-0966X/08/3901-0348; pp. 348-351, 2008.

* cited by examiner

*Primary Examiner* — Jeffrey R Swearingen
(74) *Attorney, Agent, or Firm* — Warren L. Franz; Wade J. Brady, III; Frederick J. Telecky, Jr.

(57) ABSTRACT

In one embodiment, a method of rendering stereoscopic images includes providing eyewear having a pair of lenses. Each lens is transitioned between an optically-shuttered state and an optically-transmissive state. The transitioning is in response to a voltage waveform applied substantially simultaneously to at least a portion of each lens. Each lens transitions between states in opposition to the other lens.

7 Claims, 5 Drawing Sheets

METHOD AND SYSTEM FOR THREE-DIMENSIONAL DISPLAYS

TECHNICAL FIELD

The present disclosure relates generally to display systems, and more particularly to three-dimensional display systems having enhanced capabilities.

BACKGROUND

Stereoscopic images generally represent views of a particular scene from two perspectives such as from the right eye and left eye of a viewer. Having this capability can provide the perception of depth to the viewer. In other words, stereoscopic images imply rendering separate images for the left and right eyes to create the illusion of three-dimensional depth. Some conventional stereoscopic solutions are not very efficient at transporting and displaying stereoscopic images for a variety of reasons.

SUMMARY

In one embodiment, a method of rendering stereoscopic images includes providing eyewear having a pair of lenses. Each lens is transitioned between an optically-shuttered state and an optically-transmissive state. The transitioning occurs in response to a same voltage waveform applied substantially simultaneously to at least a portion of each lens. Each lens transitions between states in opposition to the other lens.

Technical advantages of some embodiments of the present disclosure include various enhanced methods and systems for rendering stereoscopic or multi-view displays. In some embodiments, a same voltage signal may be applied to both lenses of an eyewear device, which may simplify driving circuitry, increase performance, and lower cost. Various embodiments may have enhanced brightness over conventional designs. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1A:
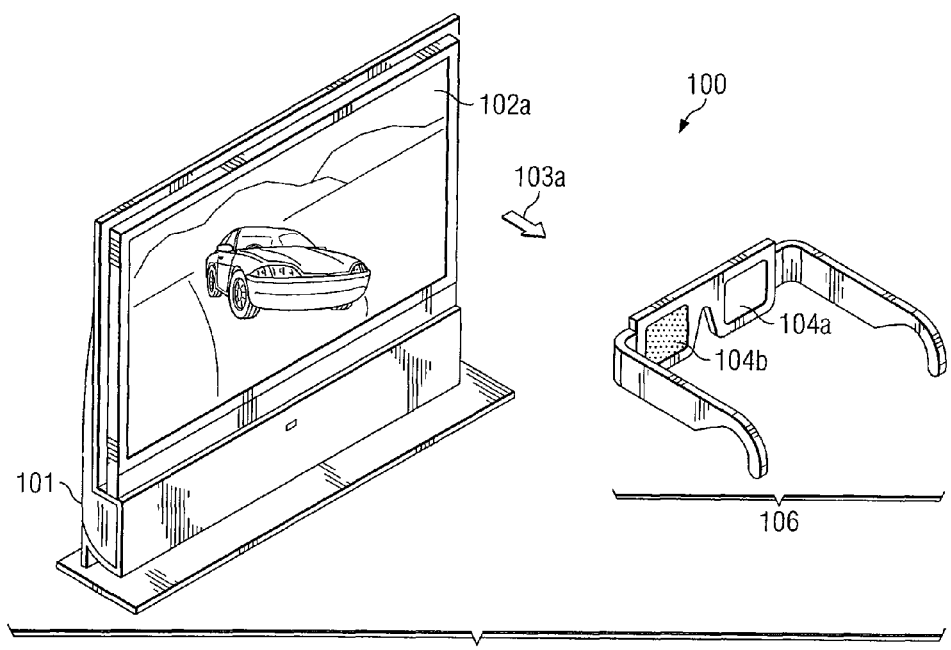
FIGS. 1A and 1B illustrate a portion of a stereoscopic display system according to one embodiment.
Figure 1B:
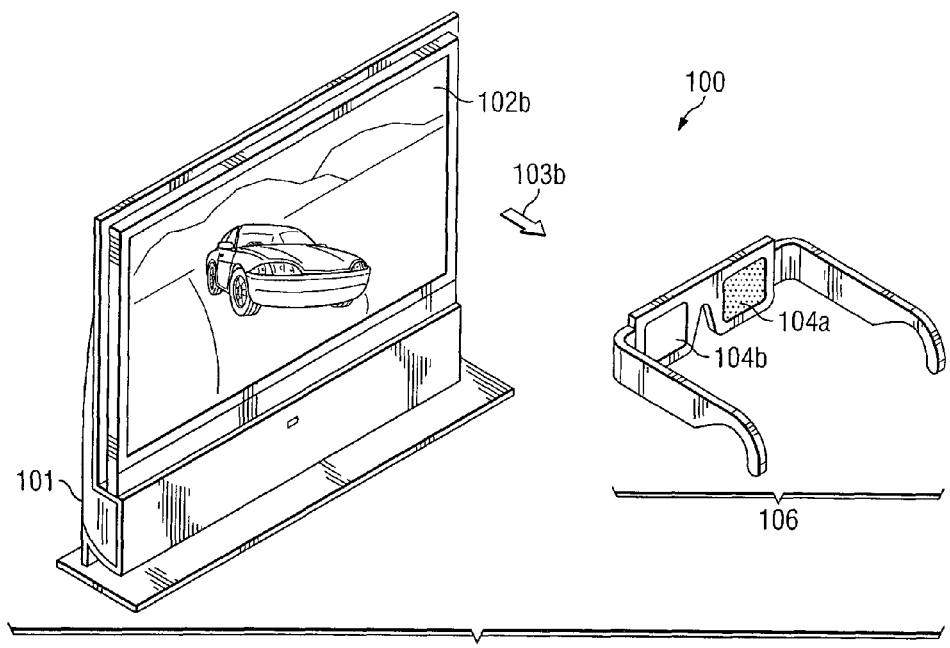

FIGS. 1A and 1B illustrate a portion of a stereoscopic display system 100 according to one embodiment. In this example, stereoscopic display system 100 generally includes a display device 101 capable of displaying left eye and right eye sub-frames 102a and 102b of a video stream. Left and right sub-frames 102a and 102b may be, for example, the left and right perspectives of a photographed object captured substantially simultaneously by left and right cameras. In some such embodiments, the rapid sequential display of left and right sub-frames 102a and 102b to respective left and right eyes of a viewer will be perceived as a single video frame having three-dimensional depth.

More specifically, the displayed sub-frames 102a and 102b transmit respective light beams 103a and 103b to a pair of lenses 104a and 104b of eyewear 106. To effect the perception of three-dimensional depth, lenses 104a and 104b transmit respective light beams 103a and 103b to the right and left eyes of a viewer, respectively, only during the display of corresponding right and left sub-frames 102a and 102b. In this manner, the right eye only perceives right sub-frames 102a and the left eye only perceives left sub-frames 102b. Thus, presentation of left and right sub-frames is time-division multiplexed. In some embodiments, lenses 104a and 104b may transition between optically transmissive and shuttered states in opposition to each other. As illustrated in FIG. 1A, right lens 104a transmits light beams 103a from right sub-frame 102a to the right eye of a viewer, while left lens 104b shutters the same. Conversely, as illustrated in FIG. 1B, left lens 104b transmits light beams 103b from left sub-frame 102b to the left eye of a viewer while right lens 104a shutters the same.

Display device 101 generally refers to any suitable device capable of presenting images to a viewer. For example, display device 101 may include a television screen, a computer monitor, a projection system screen, a handheld device display, a cell phone display, or any other of a variety of display devices. In this example, display device 101 is a high-definition television (HDTV) including substantially similar hardware components used for Digital-Light Projection (DLP®) technology developed by Texas Instruments Incorporated, as described further below.

Eyewear 106 generally refers to any device capable of selectively shuttering light beams 103 to the eyes of a user. In this example, eyewear 106 selectively shutters light beams 103 in synchronization with the sequential display of sub-frames 102 by display device 101. In some embodiments, eyewear 106 may include a photodetector or an infrared detector to facilitate the synchronization. Eyewear 106 further includes two liquid crystal shutter lenses 104a and 104b, as described further with reference to FIGS. 2A and 2B.

Figure 2A:
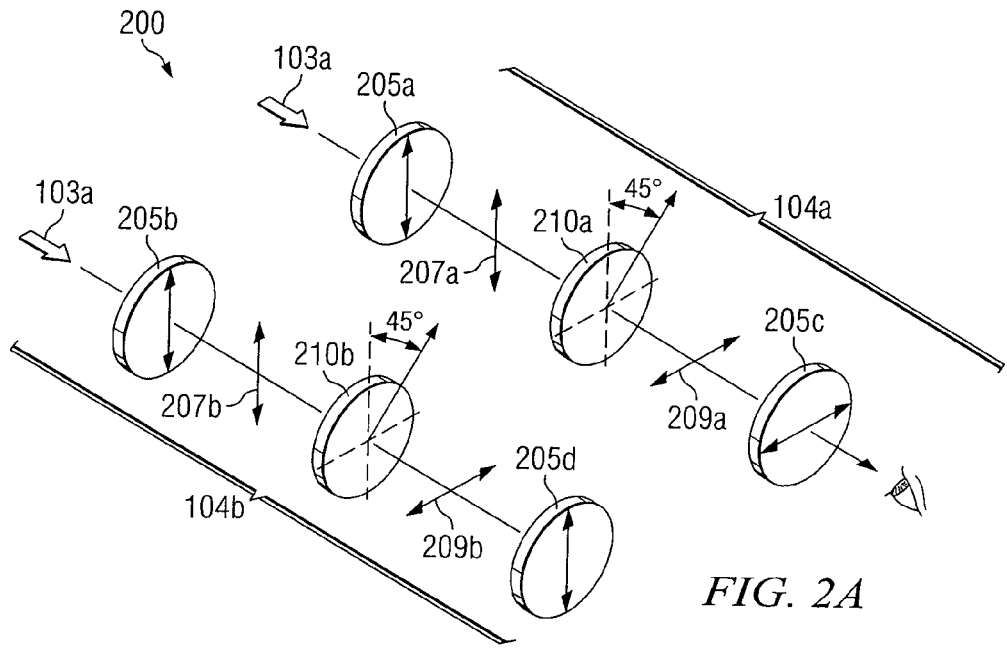
FIGS. 2A and 2B illustrate an exploded view of lenses used by the stereoscopic display system of FIGS. 1A and 1B.
Figure 2B:
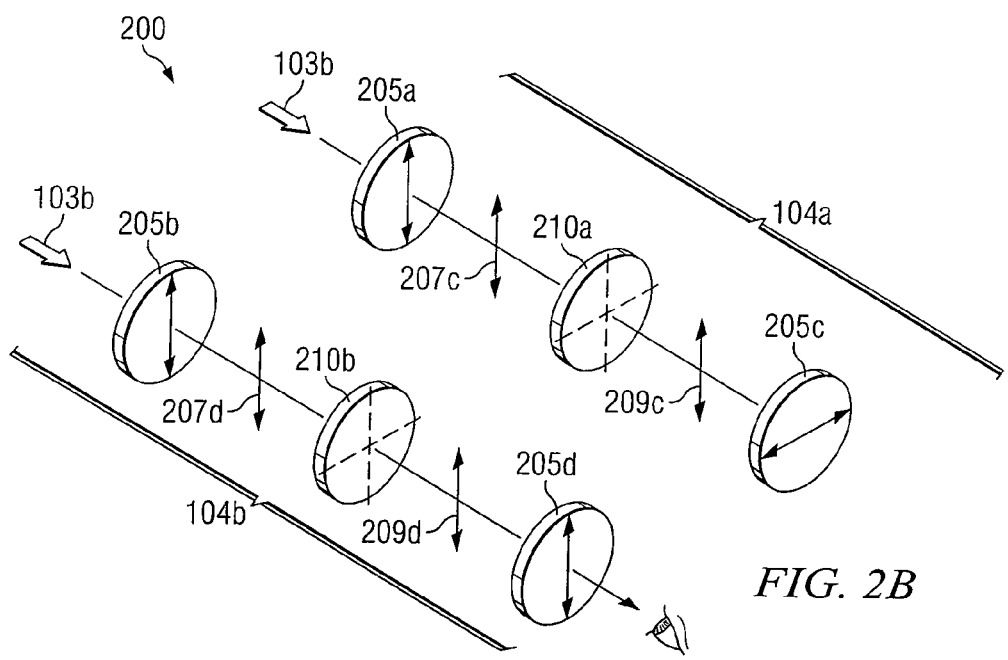

FIGS. 2A and 2B illustrate an exploded view 200 of lenses 104a and 104b used by the stereoscopic display system 100 of FIGS. 1A and 1B. In this example, each lens 104a and 104b generally includes a pair of polarizing filters 205 disposed opposite a respective liquid crystal panel 210. The polarizing filters 205 and liquid crystal panels 210 are configured within eyewear 106 so as to selectively filter light beams 103 transmitted to the eyes of a viewer. In some embodiments, each lens 104a and 104b may simultaneously receive a same control voltage and, in response, sequentially transmit and shutter incident light beams 103, thereby rendering stereoscopic images to the eyes of a viewer.

Each polarizing filter 205a, 205b, 205c and 205d generally refers to any optical device operable to polarize a light beam. In this example, polarizing filter 205c has a transmission axis oriented in a direction approximately orthogonal to the transmission axis of polarizing filters 205a, 205b, and 205d. As shown in FIGS. 2A and 2B, polarizing filters 205a, 205b, and 205d have a transmission axis oriented substantially vertically, thereby enabling polarizing filters 205a, 205b, and 205d to polarize incident light beams 103 in a substantially vertical direction. Polarizing filter 205c, however, has a transmission axis oriented substantially horizontally and thus may polarize incident light beams 103 in a horizontal direction. In other words, lenses 104a and 104b have differing configurations that affect light polarization. Although polarizing filters 205 polarize light in horizontal or vertical directions in this example, any suitable direction, including non-linear directions, may be used. In this example, polarizing filters 205a and 205b transmit horizontally-polarized light beams 207a and 207b, respectively, to liquid crystal panels 210. Liquid crystal panels 210 transmit light beams 209 to polarizing filters 205c and 205d. Although polarizing filter 205c receives light beams 209a and 209c, transmitted by liquid crystal panel 210a, polarizing filter 205c may be configured to transmit only light beam 209a, which has substantially the same polarization as polarizing filter 205c. Similarly, polarizing filter 205d receives light beams 209b and 209d, transmitted by liquid crystal panel 210b. Polarizing filter 205d, however, may be configured to transmit only light beam 209d, which has substantially the same polarization as polarizing filter 205d.

Liquid crystal panels 210a and 210b generally refer to any device operable to change the polarization of an incident light beam in response to a change in a received voltage. Liquid crystal panels 210a and 210b may include, for example, nematic, ferroelectric, discotic, or any other suitable material operable to change the polarization of an incident light beam in response to a change in a received voltage. Liquid crystal panels may further include any suitable technologies, such as, for example, homogeneous, homeotropic, pi-cell, or any other suitable technologies. If the applied voltage is sufficiently small, or zero, the polarizations of light beams 207a and 207b rotate as light beams 207a and 207b pass through liquid crystal panels 210a and/or 210b, respectively. For example, as shown in FIG. 2A, light beams 207a and 207b may have a forty-five degree E-field orientation with respect to the Liquid Crystal molecular axis orientation as they pass through liquid crystal panels 210a and 210b; however, any suitable liquid crystal panel 210 having any suitable angular orientation of the molecular axis may be used. Liquid crystal panels 210a and 210b then transmit light beams 209a and 209b, respectively, which have polarizations substantially orthogonal to received light beams 207a and 207b, respectively.

When a voltage potential is applied to liquid crystal panel 210a and/or 210b, a torque acts to align the liquid crystal molecules parallel to the applied electric field. As shown in FIG. 2B, if the applied voltage is sufficiently large, the polarizations of received light beams 207c and 207d are not rotated as light beams 207c and 207d pass through respective liquid crystal panels 210a and/or 210b. As a result, liquid crystal panels 210a and/or 210b transmit light beams 209c and 209d, respectively, having substantially the same polarization as received light beams 207c and 207d, respectively.

In stereoscopic display systems, each of a pair of lenses typically transitions in opposition to the other lens. In other words, when a left eye lens is transitioning from a transmissive or open state to a shuttered or closed state, the right eye lens is transitioning from a closed state to an open state, and vice versa. The rise and fall response times of liquid crystals are typically asymmetrical. In particular, the rise time is typically inversely related with the applied voltage, whereas the fall time is governed by visco-elastic material properties of the liquid crystal. Typical rise times can be sub-millisecond while typical fall times are a few milliseconds. The response times may also depend upon the thickness of the liquid crystal layer. In some stereoscopic display systems, the display may not present an image to the viewer during the finite rise and fall response times because doing so might degrade the contrast due to the fact that during this transitioning period the optical transmission varies from maximum to minimum, and vice versa. If an image is presented during the finite rise and fall times, the left eye might be able to see an image that was meant for the right eye only, and vice versa. Such transition periods, during which no image is presented, can be called 'dark times'. In conventional stereoscopic designs, each video frame included two dark times in sequential order, one dark time for each sub-frame. In some embodiments, decreasing the time associated with dark times and/or the total number of dark times may enable enhanced brightness for stereoscopic and multi-view display systems.

As mentioned previously, polarizing filters 205c and 205d may be configured to transmit only those light beams 209 received from liquid crystal panels 210 having the same polarization as the receiving filter 205c or 205d. In the illustrated example, only the right eye of a viewer perceives horizontally-polarized light beam 209a when little to no voltage is applied to liquid crystal panels 210a and 210b, as shown in FIG. 2A. Conversely, only the left eye of a viewer perceives vertically-polarized light beam 209d when a significantly large voltage is applied to liquid crystal panels 210a and 210b, as shown in FIG. 2B. In this manner, stereoscopic images may be rendered to a viewer by applying a same voltage potential simultaneously to both liquid crystal panels 210a and 210b. In some embodiments, liquid crystal shutters 210a and 210b may each respond more slowly to complete removal of voltages than to the application of these voltages. In other words, the optical rise and fall times of the liquid crystal shutters 210a and 210b due to the voltages applied to them are typically asymmetrical, as described further with reference to FIG. 3. It is noted that lenses 104a and 104b can be rotated with respect to each other from the configurations shown in FIGS. 2A and 2B for un-polarized light sources without affecting brightness enhancement that may occur according to the teachings of the disclosure.

Figure 3:
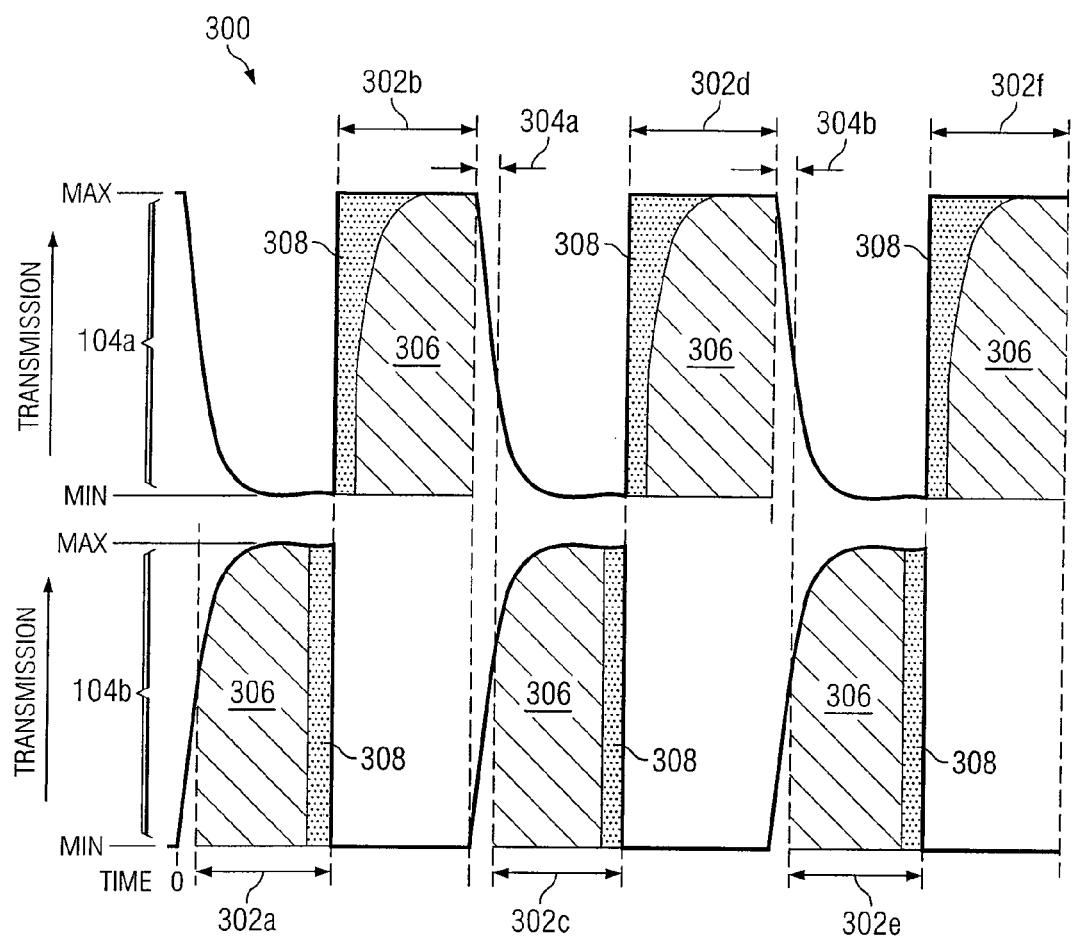
FIG. 3 illustrates a chart of optical transmission over time for the lenses of FIGS. 2A and 2B according to one embodiment.

FIG. 3 illustrates a chart 300 of optical transmission over time for the lenses 104 of FIGS. 2A and 213 according to one embodiment. The upper-half of chart 300 represents the optical transmission of lens 104a and the lower-half of chart 300 represents the optical transmission of lens 104b. Chart 300 includes the timing of six stereoscopic sub-frames, such as, for example, sub-frames 102 of FIG. 1. In the illustrated example, a first image sub-frame transmits to the left eye of a viewer before a corresponding second image sub-frame transmits to the right eye of a viewer; however, the sub-frames may be presented to the eyes of a viewer in any suitable order. In this example, a voltage is first applied simultaneously to both liquid crystal panels 210a and 210b, which transitions lens 104a into a shuttered state and lens 104b into a transmissive state. As shown in FIG. 3, the optical transition timing of lens 104a is approximately symmetrical to that of lens 104b, though the concurrent transitions are respectively inverted. In other words, lens 104a shutters light while lens 104b transmits light and vice versa. The symmetrical shuttering and transmitting of light by lens 104 may be effected, for example, by applying a same voltage signal to the lenses 210a and 210b while filters 205c and 205d are oriented orthogonal to each other.

When lens 104b is sufficiently transmissive and lens 104a is sufficiently shuttered, display device 101 displays a corresponding image sub-frame during time interval 302a. The sub-frame is then perceived by a viewer's left eye. At a moment proximate to the end of time interval 302a, the voltage is removed from both liquid crystal panels 210a and 210b. In response to the removed voltage, lens 104b rapidly transitions to a shuttered state while lens 104a rapidly transitions to a transmissive state. As shown in FIG. 3, the transition of lens 104b from a transmissive state to a shuttered state at the end of time interval 302a is significantly shorter than its previous transition from a shuttered state to a transmissive state. The difference in timing between optical transitions, in some embodiments, may be due to the material property of liquid crystal panels 210.

A brief delay may occur (not explicitly shown) before displaying the next sub-frame during time interval 302b. The sub-image displayed during time interval 302b is perceived by a viewer's right eye. At a moment proximate the end of time interval 302b, a voltage is applied to liquid crystal panels 210a and 210b. A delay 304a separates time interval 302b from the display of the next sub-frame during time interval 302c. Delay 304a allows lens 104a to reach a predetermined shutter threshold while allowing lens 104b to reach a predetermined transmission threshold. Although the threshold illustrated in FIG. 3 is approximately 50%, any suitable threshold may be used. For example, in some embodiments time interval 302c may not commence until lens 104a is 90% shuttered and lens 104b is 10% transmissive. The procedure then continues in similar manner for intervals 302c, 302d, 302e, and 302f, delay 304, and so forth.

Because the optical transmission curves of lenses 104a and 104b are symmetrical, though inverted, delay 304 occurs at the same moment for both lenses 104a and 104b. As previously noted, delay 304 is associated with removal of the same voltage applied to liquid crystal panels 210a and 210b. Any delay associated with applying a same voltage to liquid crystal panels 210a and 210b may also occur at the same moment for both lenses 104a and 104b. In other words, each video frame may only include one overlapping longer delay and one overlapping shorter delay. Embodiments that use overlapping delays for lenses 104a and 104b may reduce the total delay time per video frame by one half when compared to some conventional designs. By way of example, conventional designs typically apply and remove voltages in separate, serial sequence to similarly-configured lenses of a lens pair. In such conventional designs, each video frame includes two sets of non-overlapping delays associated with the respective rise and fall times of the applied voltages. Some embodiments of the present disclosure, however, may reduce the total delay time of such conventional designs by at least one half. The significant decrease in total delay time allows the shutters to remain open longer during a sub-frame, thereby enhancing brightness of the perceived images.

Chart 300 further illustrates shaded integrals 306 and 308 beneath the transmission curves of lenses 104a and 104b. In this example, the combined areas of integrals 306 and 308 generally represent the brightness of a sub-frame (e.g., sub-frames 102a and 102b) transmitted to the eyes of a viewer. For illustrative purposes, integral 306 represents the total amount of light transmitted to the eyes of a viewer by some conventional designs that apply less-efficient shuttering schemes. In particular, some conventional schemes sequentially apply unique voltage waveforms to identically configured lenses in order to transition each lens between optically-transmissive (open) and optically-shuttered (close) states. That is, in some such conventional schemes, a first lens transitions to a transmissive state in response to a voltage while a second lens transitions to shuttered state in response to the removal of a previously applied voltage. In such conventional designs, each video frame typically includes two optical fall-time delays because the voltages that transition each lens from a respective shuttered state to a respective transmissive state are applied at two different times.

Integrals 308, in particular, represent additional light that may be transmitted to the eyes of a viewer by the example embodiment when compared to conventional schemes having comparable optical fall times. In the example embodiment, each video frame, or each pair of sub-frames, only includes one fall time delay. Thus, time interval 302a may be extended over conventional schemes without affecting the total duration of a video frame. Because the fall times of lenses 104a and 104b coincide, little to no delay may separate time interval 302a from time interval 302b, thereby extending the potential time window for interval 302b over conventional schemes without affecting the total duration of a video frame.

The transmission curves of lenses 104a and 104b illustrated in FIG. 3 are not necessarily drawn to scale. For example, in some embodiments, time intervals 302a and 302b may have different durations. Such embodiments may take into account the additional brightness achieved due to the square edges associated with time intervals 302b, 302d, and 302f of lens 104a.

In the example embodiment, one voltage waveform is simultaneously applied to liquid crystal panels 210a and 210b. The voltage waveform has a timing that may be synchronized with the display of sub-frames 102 by display device 101 in any of a variety of ways. In some embodiments, eyewear 106 and display device 101 may communicate via wired communication paths. In other embodiments, 106 and display device 101 may communicate via wireless communication paths, such as, for example, Bluetooth™ technology. In the example embodiment, however, display device 101 communicates with eyewear 106 via an infrared pulse, as explained further below with reference to FIG. 4; however, any suitable pulse, including a narrow visible light pulse, may be used.

Figure 4:
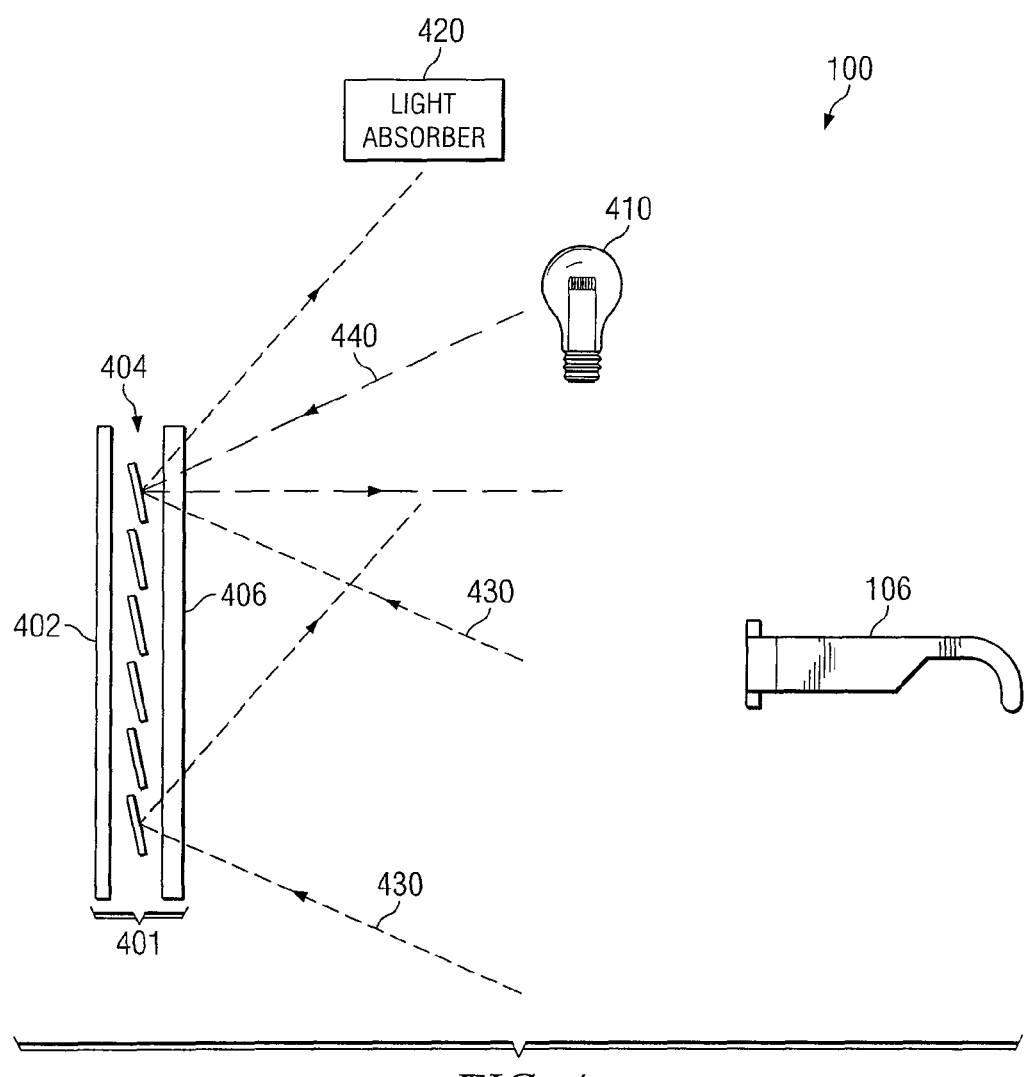
FIG. 4 illustrates a synchronization scheme that may be used by the stereoscopic display system of FIG. 1 according to one embodiment.

FIG. 4 illustrates a synchronization scheme that may be used by the stereoscopic display system 100 of FIG. 1 according to one embodiment. The illustrated portion of system 100 generally includes eyewear 106, a cross-section of one or more DLP® chips 401, an infrared source 410, and a light absorber 420. The illustrated portion of DLPO chip 401 generally includes an array of micromirrors 404 hermetically sealed within a package formed by a substrate 402 and a window 406; however, any suitable image-producing engine may be used. Each micromirror in the illustrated array 404 is in an off-state position and thus directs light beams 430 to light absorber 420. The off-state micromirrors of array 404 also direct an infrared pulse beam 440, generated by infrared source 410, along light beam path 103 of FIG. 1 toward eyewear 106.

In operation, infrared source 410 may generate one or more infrared pulses beam 440 per video frame at a respectively predetermined moment during the video frame. For example, infrared source 410 may generate one infrared beam 440 at the end of time interval 302a. Eyewear 106 may then receive and detect infrared pulse 440 and, in response, remove the applied voltage in preparation for the display of the next sub-frame during time interval 302b. Synchronizing the operation of display device 101 and eyewear 106 using an infrared pulse beam 440 while the micromirrors of array 404 are in the off position may further enhance brightness. By not relying on on-state micromirror light to communicate a synchronizing light beam to eyewear 106, more on-state micromirror time may be dedicated to the display of sub-frames 102.

In some alternative embodiments, infrared source 410 may optically communicate with a portion of a DLP® chip 401 dedicated for its use, which may preserve brightness gain. In addition, infrared source 410 may be housed in any suitable location. For example, infrared source 410 may be integrated inside a display engine, such as a television, or in a separate, non-integrated chassis. In some embodiments, the infrared sync pulse 404 can be co-incident with the sub-frame information, thereby maintaining brightness gain.

The principles of the present disclosure may also apply to alternative display systems (multi-view systems) that allow multiple viewers to simultaneously perceive different two-dimensional or three-dimensional views from the same display. For example, a first pair of eyewear 106 may contain a pair of lenses each substantially similar to lens 104a and a second pair of eyewear 106 may contain a pair of lenses each substantially similar to lens 104b. The general operation and timing, including the potentially enhanced brightness levels, of such a multi-view system may otherwise be substantially similar to that of stereoscopic display system 100 of FIG. 1. Some such embodiments may present two, three, four, or any other suitable number of video streams to the eyes of respective viewers. Example embodiments of such multi-view systems are described further below with reference to FIGS. 5A and 5B.

Figure 5A:
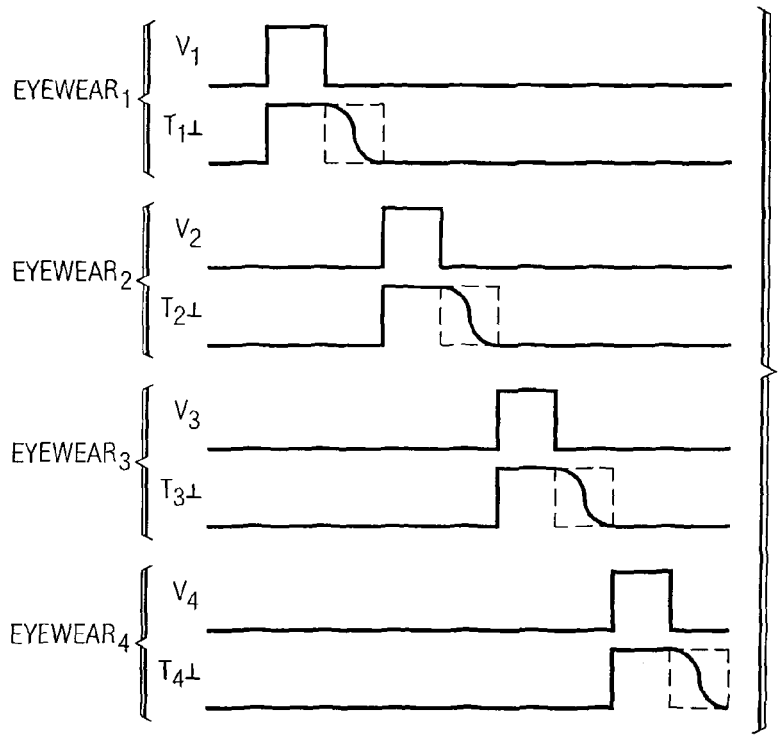
FIGS. 5A and 5B illustrate timing diagrams for a conventional multi-view system and a brightness-enhanced, multi-view system having optimized timings and polarization orientations, respectively.
Figure 5B:
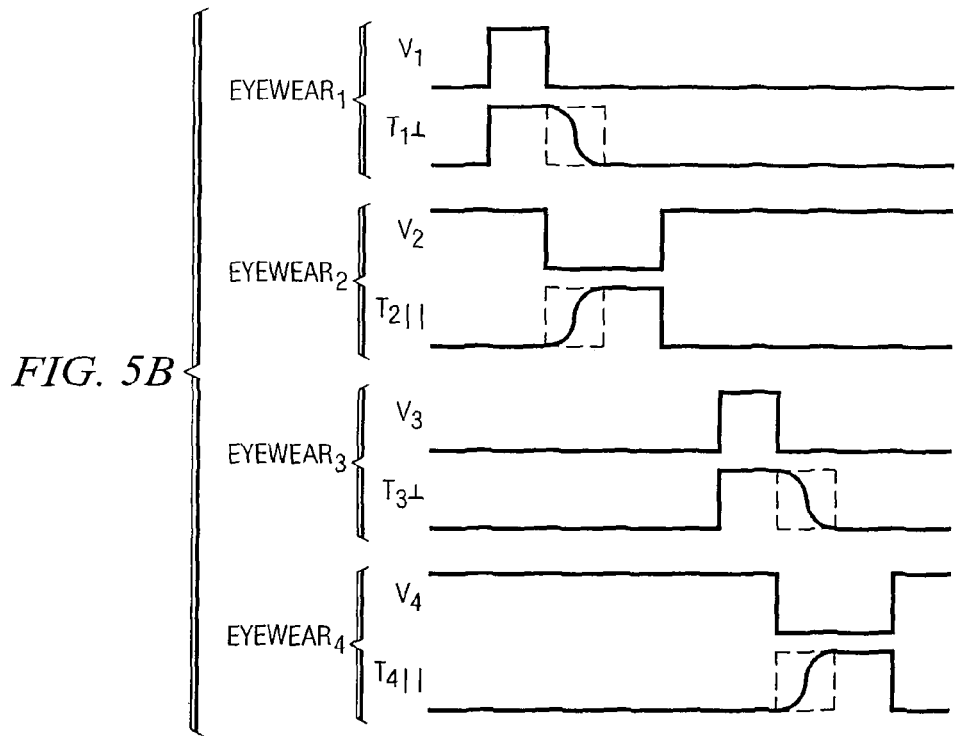

FIGS. 5A and 5B illustrate timing diagrams for a conventional multi-view system and a brightness-enhanced multi-view system, respectively. Unlike typical conventional multi-view or three-dimensional viewing systems, such as, for example, viewing systems that use the timing diagram illustrated in FIG. 5A, the eyewear that enable the timing diagrams of FIG. 5B have varying polarizing orientations that may enhance brightness levels.

In FIGS. 5A and 5B, $V_n$ represents the voltage waveforms for the $n^{th}$ eyewear (or viewer), T represents the optical transmittance for a shutter lens with respect to the voltage V, $\parallel$ represents parallel polarizer orientation, and $\perp$ represents orthogonal polarizer orientation for a certain lens. Hence $T_\perp$ will represent transmittance for a lens with orthogonal polarizer orientations, while $T_\parallel$ will represent transmittance for a lens with parallel polarizer orientations. In the illustrated examples of FIGS. 5A and 5B, both lenses of a single eyewear are simultaneously opened or closed (transmissive or shuttered) while those of other eyewear are transitioned into the opposite state. Thus, $T_\parallel$ or $T_\perp$ represents transmittance for both lenses of an eyewear.

In some alternative embodiments, however, the lenses of a single eyewear may transition opened or closed in opposition to each other while those of other eyewear are transitioned in a closed state. Some such embodiments may thus enable the perception of unique, three-dimensional displays to respective viewers of a multi-view system.

In FIGS. 5A and 5B, the hashed area in curves $T_n$ represents the time interval associated with the slow relaxation time of a LC panel. For conventional multi-view systems, the total relaxation time typically increases as a function of the number of viewers. As shown in FIG. 5A, each Eyewear$_{1-4}$ has a uniquely timed relaxation time. The increased number of sequentially-timed relaxation times may result in a brightness loss due to an increased percentage of a single video frame that is dedicated to the slow, non-overlapping relaxation times of each additional eyewear. In other words, the time sequential nature of the slow relaxation times decreases the display throughput for such multi-view display systems. Such conventional multi-view systems have longer dark times, associated with LC shutter relaxation times, which result in overall brightness loss.

FIG. 5B illustrates the timing diagram for a brightness enhanced multi-view system. In this example, each Eyewear$_{1-4}$ has a pair of lenses with either parallel or orthogonal polarizers that may be used by different viewers. In embodiments having two viewers, for example, one eyewear may have parallel polarizers and the other eyewear may have orthogonal polarizers, thereby enabling overlapping LC relaxation timing. As shown in FIG. 5B, the slow relaxation times for Eyewear$_1$ and Eyewear$_2$ are overlapped in time. The overlapping LC relaxation times and the corresponding polarization orientations together may enable increased brightness.

FIG. 5B further illustrates an example method of enabling additional eyewear (e.g., Eyewear$_3$ and Eyewear$_4$). In this example, the fast rise time of Eyewear$_3$ coincides with the fast fall time of Eyewear$_2$. In other words, eyewear with different polarizer orientations are switched on sequentially (e.g., a sequence of $\perp \parallel \perp \parallel$ and so on). Some such embodiments may further enhance brightness gain associated with an increase in the number of viewers.

To enable a universal eyewear design, provision may be provided to each eyewear that allows the user to rotate one or more polarizers by 90 degrees in-plane, thereby converting the eyewear between parallel and orthogonal orientations. Some such embodiments may thus enable a viewer to switch between three-dimensional, multi-view, and/or three-dimensional multi-view applications as desired.

Furthermore, provision of headphones associated with each eyewear may allow users to enjoy the audio stream associated with their video content. For three-dimensional or two-dimensional multi-view display systems, an infrared source inside or outside the display system may be used to send coded signals to the different eyewear, thereby enabling only an appropriate eyewear set while commanding other eyewear to stay closed or shuttered. After the initial addressing pulses and voltage turn on signals, the infrared source may be further used to convey the appropriate audio information to the appropriate viewer.

Thus, technical advantages of some embodiments of the present disclosure include various enhanced methods and systems for rendering stereoscopic or multi-view displays. As explained previously, in some embodiments, a same voltage signal may be applied to both lenses of an eyewear device, which may simplify driving circuitry, increase performance, and lower cost. Various embodiments may have enhanced brightness over conventional designs. Other technical advantages of the present disclosure will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. For example, the configurations and functionality of lens 104a may likewise apply to lens 104b and vice versa. One or both of lenses 104a and 104b may be rotated such that the transmission axes of polarizers 205a, 205b, 205c and 205d are oriented in a non-horizontal or non-vertical polarization direction. The components of display system 100 may be integrated or separated. Moreover, the operations of display system 100 may be performed by more, fewer, or other components. For example, the operations of DLP® chip 401 may be performed by two or three components. Additionally, operations of system 100 may be performed using any suitable logic. Such logic may be encoded within computer readable media. The operations of display system 100 may be performed in any suitable order.

What is claimed:

1. A stereoscopic viewing system comprising:
   a display device operable to:
      receive a video input;
      time division multiplex a presentation of left and right sub-frames of the video input; and
      transmit an infrared pulse having a timing corresponding to the presentation of the left and right sub-frames of the video input; and
   eyewear comprising an infrared detector and a pair of lenses, each lens comprising:
      a first filter operable to selectively transmit light polarized in a first direction from a light beam received from the presentation of the left and right sub-frames of the video input;
      a second filter operable to selectively transmit light polarized in a second direction from the light transmitted by the first filter; and
      a liquid crystal panel disposed between the first and second filters and operable to selectively change the polarization of the light transmitted by the first filter in response to a signal synchronized relative to a detection by the infrared detector of the infrared pulse transmitted by the display device; the liquid crystal panel comprising crystals that align from nonalignment during a rise response time in response to an applied voltage and return to nonalignment during a fall response time in response to removal of the applied voltage, the rise and fall response times being asymmetrical;
   wherein the first filter, second filter and liquid crystal panel of a first lens of the pair of lenses are relatively configured so that the first lens transmits light in response to the applied voltage and shutters light in response to removal of the applied voltage; and
   wherein the first filter, second filter and liquid crystal panel of a second lens of the pair of lenses are relatively configured so that the second lens shutters light in response to the applied voltage and transmits light in response to removal of the applied voltage.

2. The stereoscopic viewing system of claim 1, wherein the first and second polarizing directions are substantially parallel for a first lens of the pair of lenses.

3. The stereoscopic viewing system of claim 2, wherein the first and second polarizing directions are substantially orthogonal for a second lens of the pair of lenses.

4. An apparatus, comprising:
   eyewear having a pair of lenses, each lens comprising:
      a first filter operable to selectively transmit light polarized in a first direction from a light beam;
      a second filter operable to selectively transmit light polarized in a second direction from the light transmitted by the first filter; and
      a liquid crystal panel disposed between the first and second filters and operable to selectively change the polarization of the light transmitted by the first filter in response to a voltage signal; the liquid crystal panel comprising crystals that align from nonalignment during a rise response time in response to an applied voltage and return to nonalignment during a fall response time in response to removal of the applied voltage, the rise and fall response times being asymmetrical;
   wherein the first filter, second filter and liquid crystal panel of a first lens of the pair of lenses are relatively configured so that the first lens transmits light in response to the applied voltage and shutters light in response to removal of the applied voltage; and
   wherein the first filter, second filter and liquid crystal panel of a second lens of the pair of lenses are relatively configured so that the second lens shutters light in response to the applied voltage and transmits light in response to removal of the applied voltage.

5. The apparatus of claim 4, wherein the eyewear further comprises a detector operable to detect a beam of light within a predetermined frequency range; and wherein the voltage signal has a waveform which has a timing based at least in part on the detection of the beam of light.

6. The apparatus of claim 4, wherein the first polarizing direction of the first lens of the pair of lenses is substantially orthogonal to the first polarizing direction of the second lens of the lens pair.

7. The apparatus of claim 6, wherein the second polarizing direction of the first lens of the pair of lenses is substantially parallel to the second polarizing direction of the second lens of the lens pair.

* * * * *